(12) United States Patent
Shi et al.

(10) Patent No.: US 9,818,185 B2
(45) Date of Patent: Nov. 14, 2017

(54) ULTRASONIC IMAGING METHOD AND APPARATUS

(71) Applicant: SHENZHEN MINDRAY BIO-MEDICAL ELECTRONICS CO., LTD., Shenzhen (CN)

(72) Inventors: Zhiwei Shi, Shenzhen (CN); Yongqiang Dong, Shenzhen (CN)

(73) Assignee: SHENZHEN MINDRAY BIO-MEDICAL ELECTRONICS CO., LTD., Shenzhen (CN)

( * ) Notice: Subject to any disclaimer, the term of this patent is extended or adjusted under 35 U.S.C. 154(b) by 93 days.

(21) Appl. No.: 14/958,781

(22) Filed: Dec. 3, 2015

(65) Prior Publication Data

US 2016/0196646 A1 Jul. 7, 2016

Related U.S. Application Data

(63) Continuation of application No. PCT/CN2014/074326, filed on Mar. 28, 2014.

(30) Foreign Application Priority Data

Jun. 3, 2013 (CN) .......................... 2013 1 0216537

(51) Int. Cl.
G06K 9/00 (2006.01)
G06T 7/00 (2017.01)
(Continued)

(52) U.S. Cl.
CPC ........ G06T 7/0012 (2013.01); G01S 7/52046 (2013.01); G06K 9/4661 (2013.01);
(Continued)

(58) Field of Classification Search
CPC .... G01S 7/52046; G06K 9/4661; G06K 9/52; G06T 5/50; G06T 7/0012; G06T 7/60;
(Continued)

(56) References Cited

U.S. PATENT DOCUMENTS 5,748,796 A * 5/1998 Pennino .................... G06T 5/20
358/443
2006/0269111 A1* 11/2006 Stoecker ............... G06F 19/321
382/128

(Continued)

FOREIGN PATENT DOCUMENTS

CN 1924926 * 3/2007 ............... G06K 9/34
CN 1924926 A 3/2007
(Continued)

OTHER PUBLICATIONS

Zhang, et al., Adjustable-Shaped Enhanced Application of Membership Function and Fuzzy Image Thereof, Journal of Northwestern Polytechnical University, No. 3, vol. 27, Jun. 30, 2009 (Jun. 30, 2009), "Abstract only".*

(Continued)

Primary Examiner — Amara Abdi
(74) Attorney, Agent, or Firm — Kory D. Christensen; Polsinelli LLP

(57) ABSTRACT

Disclosed is an ultrasonic imaging method. The method includes: on a basis of performing fuzzy segmentation of a membership function on an echo signal, sequentially dividing an input image into a plurality of fuzzy segments according to a strength of an echo; dividing the image into a plurality of layers accordingly; and performing a spatial neighborhood operation on a membership degree value in the plurality of layers, so as to obtain a space fuzzy segmentation array; in another aspect, determining a manipulated variable vector of the image according to image content-based self-adaptive calculation or user-based input, flexibly weighting and stretching space fuzzy segmentation arrays at the layers according to the manipulated variable vector finally, and adjusting and compounding the input image by using obtained echo increment and brightness compensation, so as to obtain a final output image. Also disclosed is a corresponding ultrasonic imaging apparatus.

5 Claims, 6 Drawing Sheets

(51) Int. Cl.
| | |
|---|---|
| *G06T 5/50* | (2006.01) |
| *G01S 7/52* | (2006.01) |
| *G06K 9/46* | (2006.01) |
| *G06K 9/52* | (2006.01) |
| *G06T 7/60* | (2017.01) |

(52) U.S. Cl.
CPC .............. *G06K 9/52* (2013.01); *G06T 5/50* (2013.01); *G06T 7/60* (2013.01); *G06T 2207/10132* (2013.01); *G06T 2207/20021* (2013.01); *G06T 2207/20112* (2013.01); *G06T 2207/30004* (2013.01); *G06T 2207/30196* (2013.01)

(58) Field of Classification Search
CPC . G06T 2207/10132; G06T 2207/20021; G06T 2207/20112; G06T 2207/30004; G06T 2207/30196
USPC ............. 382/131, 128, 130, 199, 236, 266; 600/437, 443, 455, 458, 441, 447
See application file for complete search history.

(56) References Cited

U.S. PATENT DOCUMENTS

| | | | | |
|---|---|---|---|---|
| 2013/0322728 | A1* | 12/2013 | Jacobs | ................ A61B 5/055 382/132 |
| 2013/0330008 | A1* | 12/2013 | Zadeh | .................... G06N 7/02 382/195 |

FOREIGN PATENT DOCUMENTS

| | | | | |
|---|---|---|---|---|
| CN | 101207697 | * | 6/2008 | ............ H04N 1/409 |
| CN | 101207697 | A | 6/2008 | |
| CN | 101719277 | * | 6/2010 | ............. G06N 3/12 |
| WO | 2012154260 | A2 | 11/2012 | |

OTHER PUBLICATIONS

Tian, Yun et al., "A Contrast Fuzzy Enhancement Algorithm Based on 3D Medical Image" Computer Engineering and Applications, No. 4, vol. 42, Dec. 31, 2006 (Dec. 31, 2006), Abstract only.*
Liu et al ("Processing method of CR image based on fuzzy set theory", Optics and precision Engineering, No. 1, vol. 10, Feb. 28, 2002, pp. 94-97, (Abstract only).*
PCT/CN2014/074326, (English translation).*
Liu et al., Processing Method of CR Image Based on Fuzzy Set Theory, Optics and Precision Engineering, No. 1, vol. 10,Feb. 28, 2002 (Feb. 28, 2002), ISSN: TP391.4, pp. 94-97.
Zhang, Daqi etal., "Adjustable-Shaped Enhanced Application of Membership Function and Fuzzy Image Thereof", Journal of Northwestern Polytechnical University, No. 3, vol. 27, Jun. 30, 2009 (Jun. 30, 2009), ISSN: TN911, the whole document.
Tian, Yun et al., "A Contrast Fuzzy Enhancement Algorithm Based on 3D Medical Image" Computer Engineering and Applications, No. 4, vol. 42, Dec. 31, 2006 (Dec. 31, 2006), ISSN: R318.04, the whole document.

* cited by examiner

ULTRASONIC IMAGING METHOD AND APPARATUS

FIELD OF THE INVENTION

The present application relates to ultrasonic imaging methods and apparatuses.

BACKGROUND OF THE INVENTION

With rapid development of ultrasonic imaging technology, an ultrasonic imaging device could collect abundant high and low echo signals with increasing signal dynamic range. However, due to attenuation, non-uniform beam and probe directivity, the morphology of ultrasonic signals and noises appeared on an image are incongruous. The dynamic range of the signals may be varied at different positions times. Hence, a plurality of methods within relative fields has been proposed so as to display low and high echo signals simultaneously with more detail signals.

The main idea of these methods has been implemented by determining a signal dynamic range by noise signals and mapping ultrasonic signals based on the determined signal dynamic range. One of the disadvantages of these methods is that the determination of the noise signals is difficult, especially distinguishing useful tissue information from noise for relatively weak ultrasonic echo signals. With an ineffective result of distinguishing, weak signals or noises could not be controlled efficiently. Another drawback of these methods is unnatural image local contrast produced by simply mapping. Excessive stretching performed on a region having an actually small dynamic range may lead to excess black holes on tissues or highlighted lumen speckle noises.

A method for distinguishing tissue from noise has been also disclosed; however, this method fails to significantly enhance weak signals because of lacking of scalable operation on the image. In addition, such method requires an image having better contrast and resolution to be a basic image, resulting in burdening image processing and increasing processing difficulty.

SUMMARY OF THE INVENTION

Accordingly, it is necessary to put forward an ultrasonic imaging method and apparatus having a better signal dynamic range in ultrasonic imaging.

An ultrasonic imaging method may include the following steps:

inputting an echo strength at a specified point of an input image, the echo strength being used as a function input, dividing the function input with a fuzzy membership degree according to p intervals divided on a basis of an echo strength, and obtaining a space fuzzy segmentation array V at the specified point, wherein $V=[V_1, V_2, \ldots, V_p]$, the values of $V_1, V_2, \ldots, V_p$ are between 0 and 1, and $V_1+V_2+\ldots+V_p \approx 1$;

determining a manipulated variable vector U for the specified point according to an input image content-based self-adaptive calculation or a user-based input, the manipulated variable vector U being sum of any combination of vectors selected from: local gain adjustment vector ULGA, high saturation suppression vector UHSS, low echo recovery vector ULER, and brightness equalization vector UBE, wherein $ULGA=[ULGA_1, ULGA_2, \ldots, ULGA_p]$, $UHSS=[UHSS_1, UHSS_2, \ldots, UHSS_p]$, $ULER=[ULER_1, ULER_2, \ldots, ULER_p]$, $UBE=[UBE_1, UBE_2, \ldots, UBE_p]$; and calculating an inner product according to the space fuzzy segmentation array V and the manipulated variable vector U to obtain echo increment $\Delta I$ at the specified point, adjusting the echo strength at the specified point with the echo increment $\Delta I$, and taking the adjusted echo strength as an echo strength at a corresponding point in an output image, wherein $\Delta I=U^T \cdot V$, $U^T$ denotes a transposed matrix of U.

An ultrasonic imaging apparatus may include:

a fuzzy segmentation determining unit for inputting an echo strength at a specified point of an input image, the echo strength being used as a function input, dividing the function input with a fuzzy membership degree according to p intervals divided on a basis of the echo strength, and obtaining a space fuzzy segmentation array V at the specified point, wherein $V=[V_1, V_2, \ldots, V_p]$, the values of $V_1, V_2, \ldots, V_p$ are between 0 and 1, and $V_1+V_2+\ldots+V_p \approx 1$;

a manipulated variable vector determining unit for determining a manipulated variable vector U for the specified point according to an input image content-based self-adaptive calculation or a user-based input, the manipulated variable vector U being sum of any combination of vectors selected from: local gain adjustment vector ULGA, high saturation suppression vector UHSS, low echo recovery vector ULER, and brightness equalization vector UBE, wherein $ULGA=[ULGA_1, ULGA_2, \ldots, ULGA_p]$, $UHSS=[UHSS_1, UHSS_2, \ldots, UHSS_p]$, $ULER=[ULER_1, ULER_2, \ldots, ULER_p]$, $UBE=[UBE_1, UBE_2, \ldots, UBE_p]$; and an image outputting unit for calculating an inner product according to the space fuzzy segmentation array V and the manipulated variable vector U to obtain echo increment $\Delta I$ at the specified point, adjusting the echo strength at the specified point with the echo increment $\Delta I$, and taking the adjusted echo strength as an echo strength at a corresponding point in an output image, wherein $\Delta I=U^T \cdot V$, $U^T$ denotes a transposed matrix of U.

In the above solution, by means of echo strength-based fuzzy segmentation and different control parameters used at each segmentation, functions including local gain adjustment, high saturation suppression, low echo recovery and brightness equalization could be achieved, thus enriching detail (resolution) of image signals.

BRIEF DESCRIPTION OF THE DRAWINGS

The foregoing and other objects, features and advantages of the present application will be distinct from the following detailed description of particular embodiments of the present application, as illustrated in the accompanying drawings in which like reference characters refer to the same parts throughout the drawings. The drawings are not necessarily to scale, emphasis instead of placed upon illustrating the principles of the present application.

DETAILED DESCRIPTION OF THE INVENTION

Particular embodiments of the present application may be described in detail with reference to the accompanying drawings for easily appreciating the above-mentioned objects, features and advantages of the present application. Various details may be set forth in the following so as to make full sense of the present application. However, other embodiments of the present application different from those illustrated herein and similar improvements made by those skilled in the art without departing from the spirit of the present application could also be implemented. Thus the present application is not limited in the particular embodiments disclosed as below.

Figure 1:
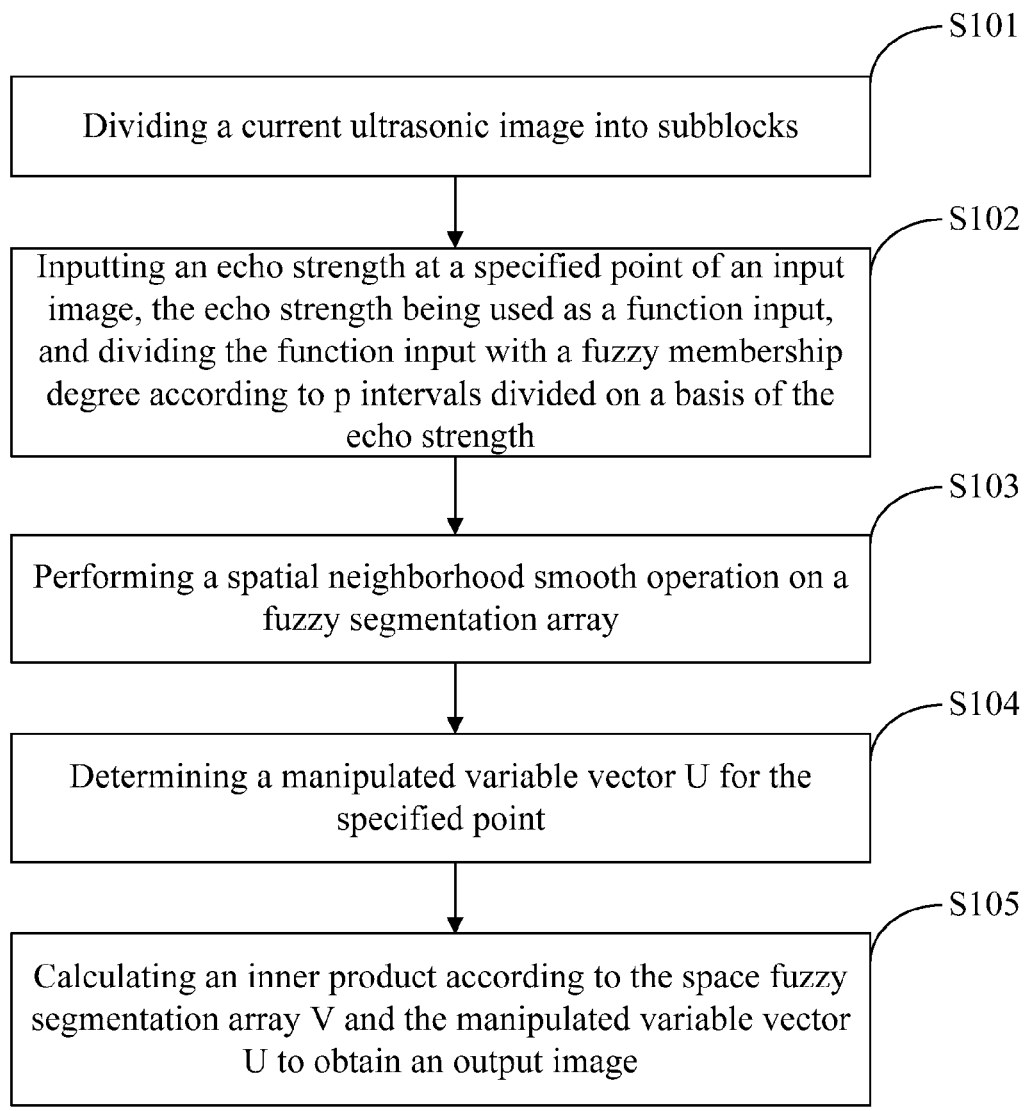
FIG. 1 is a flowchart schematically illustrating the ultrasonic imaging method in accordance with an embodiment.

FIG. 1 is a flowchart illustrating the ultrasonic imaging method of an embodiment. As shown in FIG. 1, the ultrasonic imaging method of the embodiment may include the following steps S101-S105.

S101, dividing a current ultrasonic image into subblocks.

Figure 2:
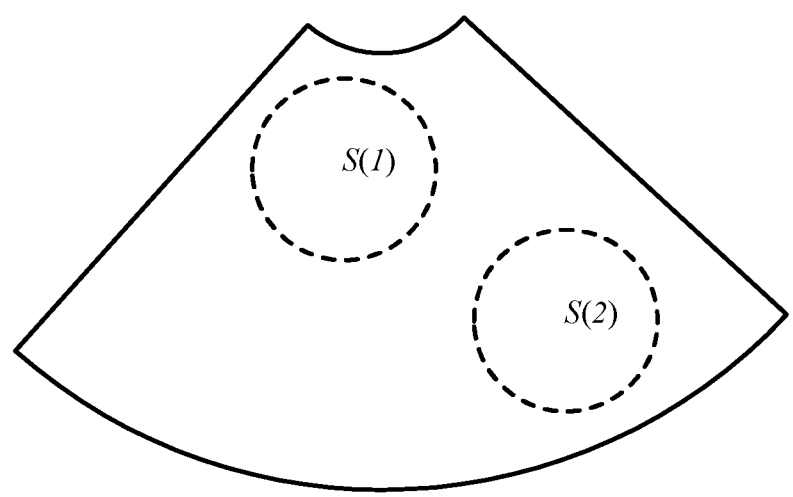
FIG. 2 is a schematic diagram illustrating subblock division of the embodiment shown in FIG. 1.

Influenced by transducer, front-end circuit and signal processing, an ultrasonic image may also be involved with detected patients' condition including various attenuation degrees, clutters, strong reflecting interfaces and acoustic windows. Accordingly, it is important to detect and analyze an image and altering image effect so as to adapt to different conditions. In this step, by means of dividing into subblocks, local information of the image may be acquainted to facilitate subsequent adjustment of image content. The subblock division may be carried out according to a predetermined rule, for example, maintaining a subblock to be rectangular, round or other shapes, or maintaining adjacent subblocks to be overlapped with a certain proportion. In an embodiment, as shown in FIG. 2, an ultrasonic image S is divided into a plurality of round subblocks S(1), S(2) and etc. . . . . In another embodiment, an M×N rectangular ultrasonic image may be divided into a plurality of m×n rectangular subblocks, here the unit of the M×N rectangular ultrasonic image and the unit of an m×n rectangular subblock could be actual physical length unit such as millimeter, or pixel unit.

Furthermore, the ultrasonic image used for subblock division in the step may be an image after envelope extraction, because signals obtained after envelope extraction could better reflect amplitude of echoes, making it easier for statistical image analysis. That is, the ultrasonic image method of the embodiment may be performed at a certain stage after envelope extraction of an ultrasonic image. However, the present application is not limited to such a manner, it is possible to perform the ultrasonic image method of the embodiment before the envelope extraction.

S102, inputting an echo strength at a specified point of an input image, the echo strength being used as a function input, and dividing the function input with a fuzzy membership degree according to p intervals divided on a basis of the echo strength.

After the subblock division in the step 101, the procedure of following steps may use a divided sub-image as an input image.

In this step, p intervals corresponding to different echo strength could firstly be defined for better manipulating local gray-scale of the input image. In the embodiment, there is no restriction to the number of the predefined p intervals. Generally, the larger the value of p, the greater the number of the intervals of echo strength; thereby a finer adjustment and an increased amount of calculation may be realized. As a consequence, the value of p could be flexibly selected according to actual situation. For example, in an embodiment, the value of p could be about 3-20 for fuzzy segmentation processing. For the sake of simplicity, five intervals (i.e. p=5), ultra-low echo, low echo, medium echo, high echo and ultra-high echo, are taken as an example in the embodiments hereinafter for detailed description. However, those skilled in the art could appreciate that the present application is not limited to such value.

Figure 3:
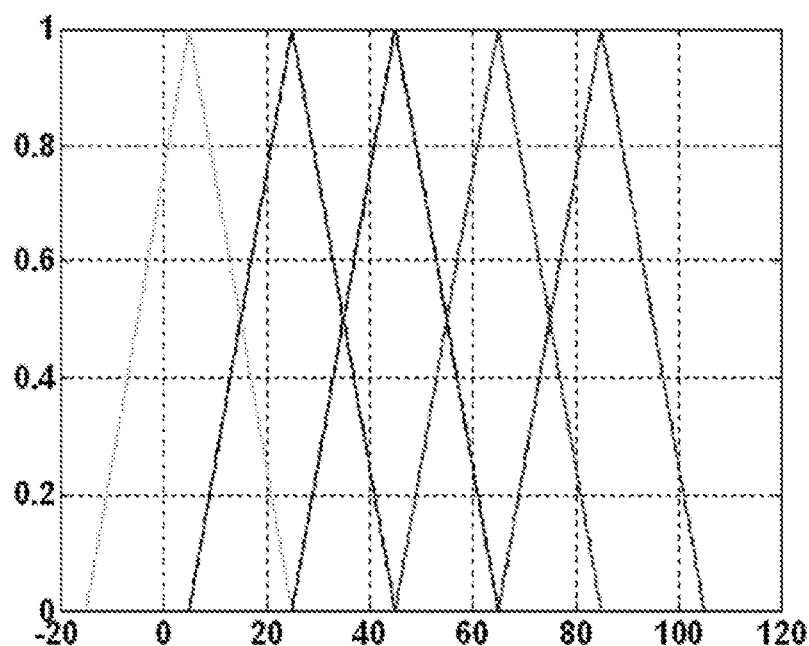
FIG. 3 is a schematic diagram of a triangle membership function used in the embodiment shown in FIG. 1.

Then the five intervals of echo strength could be represented by membership functions. A symmetric triangular membership function may be taken as an example as below. Five segmented triangular functions as shown in FIG. 3 from left to right may represent the five intervals i.e. ultra-low echo, low echo, medium echo, high echo and ultra-high echo. In the figure, the horizontal coordinate may indicate the echo strength and the vertical coordinates may indicate the membership degree. As seen from the figure, the echo strength corresponding to the highest membership degree among the five functions may be positioned at 5 db, 25 db, 45 db, 65 db and 85 db respectively, a span of a single segmentation is 40 db, and there is an overlap of 20 db between adjacent intervals.

The input image may be processed with fuzzy segmentation based on each membership function so as to determine the five intervals i.e. ultra-low echo, low echo, medium echo, high echo and ultra-high echo which are denoted by VL(X), L(X), M(X), H(X) and VH(X) respectively. In this way, the echo strength I at each specified point in the input image may be regarded as a function input (i.e. X=I), thus a fuzzy segmentation array having a length of 5, i.e. [VL(I), L(I), M(I), H(I), VH(I)], may be outputted by function calculation or table lookup. With features of membership function, the values of VL(I), L(I), M(I), H(I) and VH(I) may between 0 and 1, and the sum thereof may equal to 1. Referring to FIG. 3, the echo strength is 5 db, for example, a corresponding output may be [1, 0, 0, 0, 0]; when the echo strength is 10 db, for example, a corresponding output may appropriately be [0.5, 0.5, 0, 0, 0].

Figure 4:
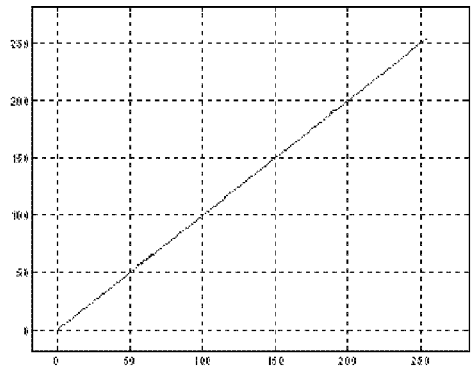
FIG. 4 is a schematic diagram of a ramp function for an object to be adjusted by the membership function shown in FIG. 3.

After the division with fuzzy membership degree in the step, five fuzzy segments having various strength may be obtained, and could be applied with different gains to achieve controlling image details in subsequent procedures. Before that, a ramp function (as shown in FIG. 4) is taken as an example for briefly describing image grayscale affected by succeeding segmentation adjusting method.

Provided that each fuzzy segment at the function input X is applied with various gains GainVL, GainL, GainM, GainH and GainVH, then a signal variation at X could be represented by a formula as below:

$$\Delta X = \text{Gain}VL \cdot VL(X) + \text{Gain}L \cdot L(X) + \text{Gain}M \cdot M(X) + \text{Gain}H \cdot H(X) + \text{Gain}VH \cdot VH(X) + \Delta \text{GainComp}$$

where ΔGainComp may denote brightness compensation and involve with segmentation of echo adjustment. With adjustment of the amplitude of medium-low echo, the brightness compensation may have less impact on the overall brightness of the image; on the contrary, with adjustment of the amplitude of medium-high echo, the brightness of the image may be adjusted with large amplitude.

Figure 5:
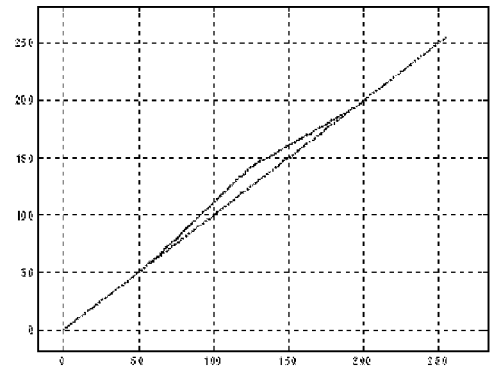
FIGS. 5-9 are schematic diagrams respectively showing results of adjusting the ramp function signal with combinations of different parameters.
Figure 6:
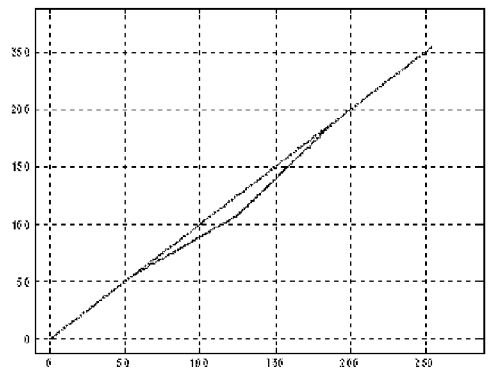

As shown in FIG. 5 and FIG. 6, the signals may be adjusted by GainM so as to change grayscale of a final image. GainM>0 is set in FIG. 5, which may increase local contrast of medium-low echo and reduce local contrast of medium-high echo. With increasing GainM, the effect may be stronger. Similarly, GainM<0 is set in FIG. 6, which may increase local contrast of medium-high echo and reduce local contrast of medium-low echo. As seen from the result, through altering GainM, the monotonicity of echo signals may be maintained, and image adjustment corresponding echoes from high to low may be achieved simultaneously.

Figure 7:
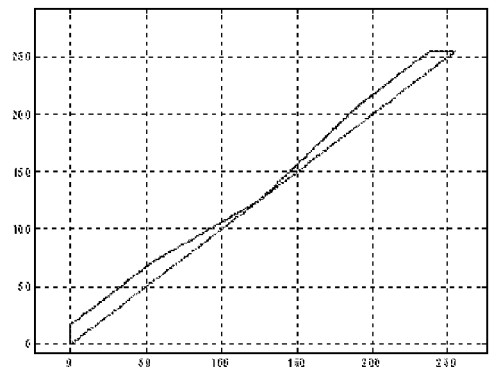

Furthermore, GainVL, GainL, GainH and GainVH may be set to be greater than 0 while GainM=0 in FIG. 7, the result therefrom is similar to that in FIG. 6, except that the difference therebetween is an increased image intensity in FIG. 7. The result of grayscale adjustment in FIG. 7 may be consistent with that in FIG. 6.

Figure 8:
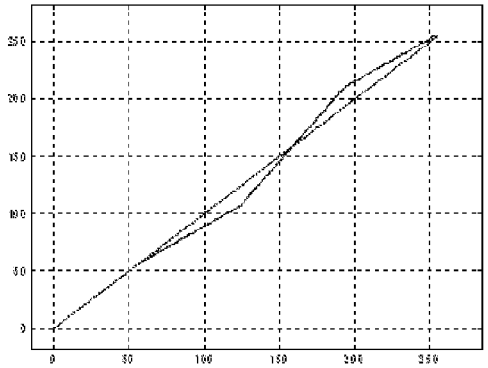

Then, to enhance the contrast of medium to high echo and to avoid some extra high saturation, the setting may be GainM<0, GainH>0 and GainVH<0, and the result therefrom could be illustrated in FIG. 8.

Finally, for an image having an extra dynamic range, it is very important to allow valid image information to be effectively mapped to a display device. For example, when the signal dynamic range is beyond a display dynamic range, there may have large high saturation or there may have loss of low echo, the setting may be GainVL>0 and GainVH<0 respectively to adjust lost signal dynamic range to a grayscale range recognized by human eyes, and the result therefrom may be shown in FIG. 9.

It is needed to note that, the division with fuzzy membership degree is illustrated by taking a symmetrical triangular membership function as an example, but the present application is clearly not limited to such function; those skilled in the art may appreciate that other forms of membership functions could also be used within the spirit of the present application.

Figure 10:
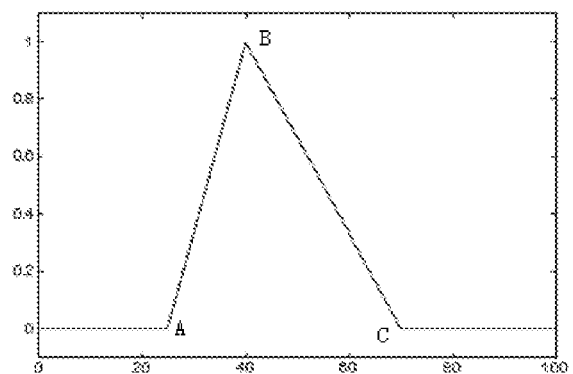
FIGS. 10-12 are schematic diagrams of other membership functions which could be used respectively in the embodiment shown in FIG. 1.

For example, in an embodiment, a normal form of a triangular function which has three vertices corresponding to a, b, c at the abscissa in turn as shown FIG. 10 may be applied, wherein $f(x)=\max(\min((x-a)/(b-a), (c-x)/(c-b)), 0)$, a may denote the horizontal ordinate of point A shown in FIG. 10, b may denote the horizontal ordinate of point B shown in FIG. 10, and c may denote the horizontal ordinate of point C shown in FIG. 10. Here A, B and C may be vertices of the triangular function shown in FIG. 10 respectively.

Figure 11:
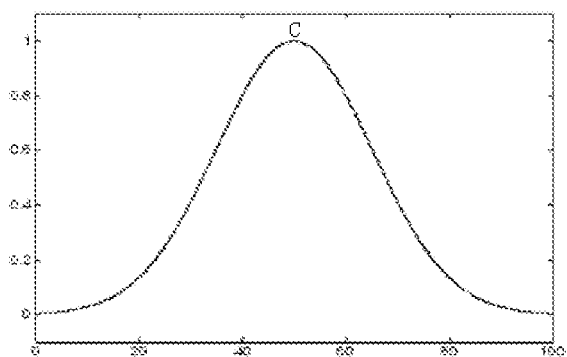

In another embodiment, a smooth membership function, for example, a Gaussian function having a distribution parameter σ and a centre C as shown in FIG. 11, where $$f(x) = e^{\frac{(x-c)^2}{(2\times\sigma^2)}},$$

may be used to improve the continuity of signal gradient transition. Here, c may denote the abscissa of the peak (the centre point) C of the Gaussian function shown in FIG. 11.

Figure 12:
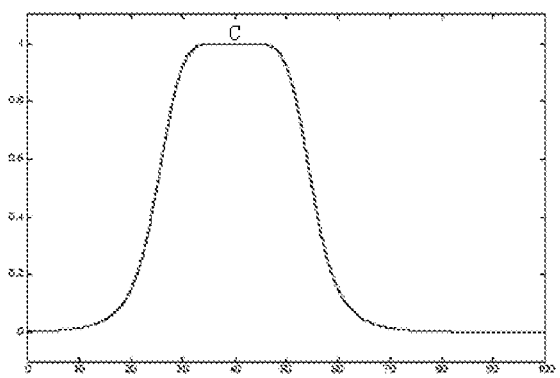

In still another embodiment, for flexible signal control, two or more adjacent membership functions may be combined into one to form a membership function having a "flat top", for example a "bell" function shown in FIG. 12 where $$f(x) = \frac{1}{\left(1+\left|\frac{x-c}{a}\right|^{2a}\right)}.$$

Here, c may denote the abscissa of the centre C of the bell membership function shown in FIG. 11, where the function is bilateral symmetry, a and b may denote control parameters of the bell membership function respectively for controlling shape and span of the bell membership function.

S103, performing a spatial neighborhood smooth operation on a fuzzy segmentation array.

As mentioned above, in the step S102, the echo strength at a specified point of the input image is inputted as a function input to be divided with a fuzzy membership degree, so that a fuzzy segmentation array having a length of p may be outputted. However, such division is merely based on echo strength, regardless of spatial continuity of the image. Specifically, for a certain input image having discrete black spots, when echoes of tissue and echoes of such black spots are classified into different fuzzy sets which have opposite manipulated variable vectors, the black spots may be shown more apparently.

Accordingly, to improve the continuity of final image and suppress local sudden change caused by black spots and noisy points, in this step, a signal matrix formed by fuzzy segmentation array [VL(I), L(I), M(I), H(I), VH(I)] of all points in the input image may be performed with a spatial neighborhood smooth operation, so that points adjacent in space in the input image may be divided into one interval with a large membership degree, thereby remaining a certain "spatial structure" to keep spatial continuity during adjustment of image grayscale. In an embodiment, the spatial neighborhood smooth operation may be implemented by linear or nonlinear smoothing, such as opening/closing in morphology, nonlinear black spots filling, low-pass filtering, rotating mask, median filtering and other algorithms. After performed by such smoothing operation, the signal matrix may be able to keep spatial continuity structure of local grayscale not detail (resolution) and contrast resolution of original image; thereby a space fuzzy segmentation array $V=[V_1, V_2, \ldots, V_p]$ corresponding to each specified point of the input image may be obtained. It could be noted that $V_1, V_2, \ldots, V_p$, each having value between 0 and 1, may denote membership degree of each interval comparative to current echo image, and no longer represent the echo strength. Still the sum of these vectors may be appropriately equal to 1.

The spatial neighborhood smooth operation in the step is performed after dividing with fuzzy membership degree; however, the present application is not limited to such manner. In an embodiment, to improve the spatial continuity of the image, it may firstly perform a smooth operation on the input image, then calculate with a fuzzy membership function to obtain a space fuzzy segmentation array having a length of 5, i.e. $V=[V_1, V_2, V_3, V_4, V_5]$.

S104, determining a manipulated variable vector U for the specified point.

After obtaining the space fuzzy segmentation array V corresponding to the specified point of the input image in the above steps S101-S103, a manipulated variable vector U may be determined at the specified point. In an embodiment, the manipulated variable vector U may be sum of any combination of vectors selected from: ULGA (local gain adjustment) vector, UHSS (high saturation suppression) vector, ULER (low echo recovery) vector, and UBE (brightness equalization) vector. It will be described respectively in detail as below.

Due to internal gain of an ultrasonic imaging system and conditions of different patients, distribution of signals and noises in different input sub-images may vary; accordingly it is needed to perform correction for local gain so as to improve the consistency of the whole image. Based on distribution of echo strength of current and adjacent sub-blocks, and by means of analyzing image histogram of the adjacent regions, a local gain correction may be calculated out.

For some images, image uniformity may not be improved only by local gain due to difference of signal-noise ratio (SNR). Accordingly, it is necessary to perform adjustment of brightness equalization. Unlike adjustment of local gain, the adjustment of brightness equalization may focus on intensity unification of images having different SNRs. Specifically, with respect to an area having a lower SNR, noise may raise with the increment of signal when the intensity is enhanced only by local gain, resulting in producing a negative effect. Hence it is necessary to readjust ratios of echo fuzzy segmentation according to distribution of current signal, so that grayscale level may be adjusted, which ultimately improves uniformity of the whole image.

When ultrasonic waves encountered a strong reflecting interface, a stronger echo signal may be generated. Due to limited display dynamic range, a strong high saturation may be produced, resulting in high saturation in grayscale without levels shown on an ultrasonic image. Through analyzing the display dynamic range and the echo strength, a relative interval for echoes having high saturation may be calculated out. After adjusting shape of mapping curve, levels of some echoes having high saturation may be recovered. Similarly, recovery of low echo signals may be implemented by adjusting ultrasonic signals which lean to overflow downwards to a user-based display dynamic range, thus increasing information of effective signals. With combined use of high saturation suppression and low echo signal recovery, together with a user-based dynamic range, the image display content may be optimized and the image quality may be improved.

The above-mentioned local gain adjustment, high saturation suppression, low echo recovery and brightness equalization may be implemented in accordance with the space fuzzy segmentation in the above steps. Specifically, for such four functions, the above five fuzzy segment may be corresponded to four groups of control vectors having a length of 5. In an embodiment, such control vectors may be acquired by image content-based adaptive calculation, or by user-based input through interaction with a user. The former (i.e. image content-based adaptive calculation) may be firstly described in detail as follows.

(1) Local Gain Adjustment

Local gain adjustment vectors may be determined by a simple rule, that is, setting values of all parameters in the five intervals i.e. ultra-low echo, low echo, medium echo, high echo and ultra-high echo to be equal, i.e. $ULGA_1=ULGA_2=\ldots=ULGA_p=\Delta Gain$, where $\Delta Gain$ may denote local gain needed during adjustment of a current point. In an embodiment, $\Delta Gain$ may be determined by some existing techniques disclosed by such as a US patent application No. 20120260736 or a Chinese patent application No. 200910109156.

Figure 9:
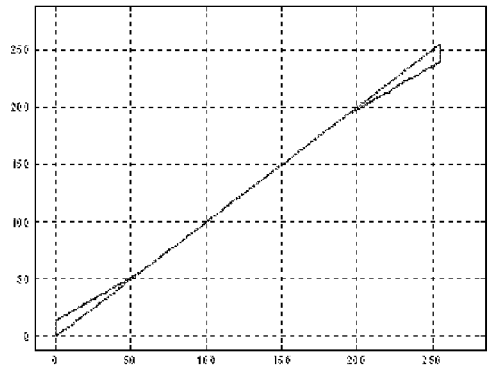

With respect to local gain adjustment, parameters of brightness equalization may be set more flexibly. Generally speaking, for image area having a high SNR, parameters used for medium-high echoes may be smaller than those for low echo; on the contrary, for image having a low SNR, parameters for medium-low echoes may be adjusted according to actual situation so as to increase contrast of medium-low echoes. The recovery of low echo signals may refer to map low echo signals as much as possible into the display dynamic range, for example, with setting GainVL>0 as illustrated in FIG. 9 and features of signal distribution, GainL and GainM may be set properly to obtain more proper distribution of medium-low echo. Similarly, for echo signal having local high saturation, levels of medium-high echo may be remained by setting GainVH<0 as well as GainH and GainM to solve high saturation suppression. Furthermore, with respect to brightness equalization, low echo signal recovery and high saturation suppression, parameters in these vectors may be different. Determining methods and rules for each vector will be described as below.

(2) High Saturation Suppression

According to the example of adjustment illustrated in the above step S102 together with FIGS. 5-9, the signal variation of image may be controlled by changing sign and value of each manipulated parameter. Accordingly, in the step, by setting combination of parameters having various signs and values, different levels of high saturation suppression vectors may be predetermined. For example, in an embodiment, five levels i.e. very strong level, strong level, medium level, weak level and unchanged level of high saturation suppression may be defined. The unit of the manipulated parameter corresponding to each level may be db and the value thereof could be flexibly set according to requirements of clinical image standard. For example, "very strong" level may be set according to needs of generating significant change in a clinical image based on clinical requirements, and other levels may be changed obviously in turn.

Furthermore, an actual manipulated parameter may be a fuzzy value between two levels, such as a value between "very strong" and "strong" levels, or between "unchanged" and "weak" levels, which could be determined according to actual clinical image.

For example, in an embodiment, each high saturation suppression vector may be defined as shown below.

Very strong: UHSS=[0, 0, 0, −5, −10]
Strong: UHSS=[0, 0, 0, −3, −7]
Medium: UHSS=[0, 0, 0, −2, −3]
Weak: UHSS=[0, 0, 0, −1, −1]
Unchanged: UHSS=[0, 0, 0, 0, 0]

Figure 13:
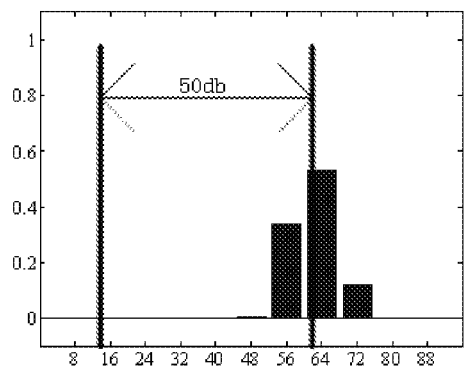
FIGS. 13-15 are schematic bar graphs respectively showing distribution of echo signals used in the embodiment shown in FIG. 1.

Then, after analyzing the input image, distribution of echo signals may be obtained, and the level of high saturation may be determined according to the distribution. With referring to an example shown in FIG. 13, the bar graph may reflect distribution of echo signals of current input image. In the example, when the user-based display dynamic range of an ultrasonic device may be 50 db (10 db-60 db), that is, an echo signal having a strength of 10 db may be displayed as a grayscale of 0 shown on a screen, an echo signal having a strength of 60 db may be displayed as a grayscale of 255 on the screen, and other echo signal having a strength less than 10 db which corresponds to loss of weak echo signal or other echo signal having a strength greater than 60 db which corresponds to high saturation may not be displayed on the screen. As seen from FIG. 13, most echo signals in the input image are beyond 60 db, resulting in serious high saturation. Accordingly, the level of high saturation for the current input image may be determined to be "serious" selected from a five predetermined levels "very serious", "serious", "medium", "slight" and "no", or may be determined to be a level between "very serious" and "serious" acquired by a principle of fuzzy inference (such as a classic reasoning method Mandani disclosed by Mamdani, E. H. in "Applications of fuzzy logic to approximate reasoning using linguistic synthesis, IEEE transactions on computers, vol. 26, no. 12, pp. 1182-1191, 1977."). It may be noted that, the distribution of echo signals may be described by histogram statistics in the above example, but the present application is not limited to such manner; in other examples, the distribution of the echo signals may be illustrated by a membership function mentioned in the step S102. Although the computing method of the membership function is different from that of the bar graph, the connotations thereof may be similar in fuzzy theory and in statistics. The level of high saturation may be obtained directly from the image through these two methods, so the distribution of echoes described by membership function may not be repeated herein.

After that, a correspondingly strong high saturation suppression function may be needed to the determined "serious" high saturation; accordingly, a "strong" high saturation suppression vector [0, 0, 0, −3, −7], as the final determined high saturation suppression vector UHSS, may be selected from the above predetermined levels of high saturation suppression vectors.

(3) Low Echo Recovery

Similarly to the determination of the high saturation suppression vector, when determining low echo recovery vector, different levels for low echo recovery vector may be predetermined firstly. For example, in an embodiment, five levels, "very strong", "strong", "medium", "weak" and "unchanged", may be defined for low echo recovery vector, which may be shown as below.

Very strong: ULER=[10, 5, 0, 0, 0]
Strong: ULER=[7, 3, 0, 0, 0]
Medium: ULER=[3, 2, 0, 0, 0]
Weak: ULER=[2, 1, 0, 0, 0]
Unchanged: ULER=[0, 0, 0, 0, 0]

Figure 14:
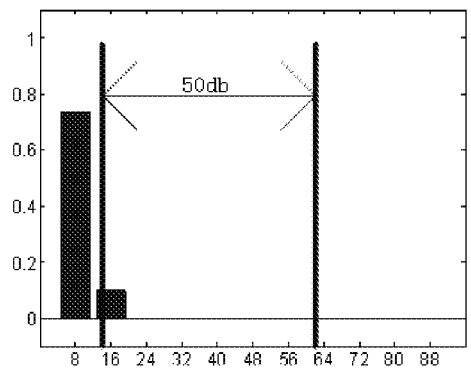

Then, according to the distribution acquired by analysis of the input image, level of low echo loss may be determined. With referring to an example shown in FIG. 14, from the bar graph shown in the figure, some echo signals in the input image are below 10 db, and a certain degree of low echo signal recovery may be needed to on the surface of the image. Accordingly, the level of low echo loss for the current input image may be determined to be "medium" selected from a five predetermined levels "very serious", "serious", "medium", "slight" and "no".

After that, a correspondingly medium low echo recovery function may be needed to the determined "medium" low echo loss; accordingly, a "medium" low echo recovery vector [3, 2, 0, 0, 0], as the final determined low echo recovery vector ULER, may be selected from the above predetermined levels of low echo recovery vectors.

(4) Brightness Equalization

Similarly to the determination of the high saturation suppression vector, when determining brightness equalization vector, different levels for brightness equalization vector may be predetermined firstly. For example, in an embodiment, five levels, "very strong", "strong", "medium", "weak" and "unchanged", may be defined for brightness equalization vector, which may be shown as below.

Very strong: UBE=[0, 5, 10, 6, 2]
Strong: UBE=[0, 3, 7, 3, 1]
Medium: UBE=[0, 2, 5, 2, 1]
Small: UBE=[0, 1, 2, 1, 0]
Unchanged: UBE=[0, 0, 0, 0, 0]

Figure 15:
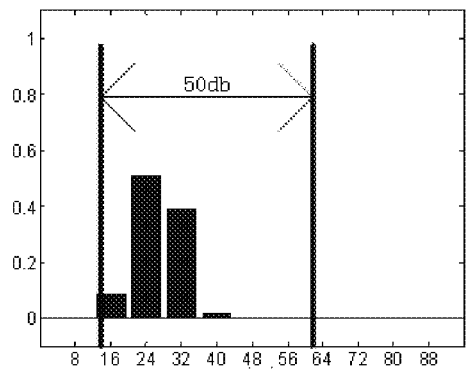

Then, according to the distribution acquired by analysis of the input image, level of brightness may be determined. With referring to an example shown in FIG. 15, from the bar graph shown in the figure, some signals in the input image are weak, which needs to increase image intension. Accordingly, the level of brightness for the current input image may be determined to be "dark" selected from a five predetermined levels "very dark", "dark", "less dark", "slightly dark" and "normal".

After that, a correspondingly strong brightness equalization function may be needed to the determined "dark" level of brightness; accordingly, a "strong" level of brightness equalization vector [0, 3, 7, 3, 1], as the final determined brightness equalization vector UBE, may be selected from the above predetermined levels of brightness equalization vectors.

With the foregoing, in the embodiment each control vector (e.g. high saturation suppression vector DHSS, low echo recovery vector ULER and brightness equalization vector UBE) may be acquired based on the analysis of the input image. In the embodiment, a plurality of control vectors may be obtained simultaneously in one analysis of the input image (e.g. high saturation suppression vector DHSS, low echo recovery vector ULER and brightness equalization vector UBE may be acquired simultaneously at once), or various control vectors may be obtained respectively by different analyses of the input image.

After determining the local gain adjustment vector, the high saturation suppression vector, the low echo recovery vector and the brightness equalization vector, these vectors may be added to obtain a final manipulated variable vector U=ULGA+UHSS+ULER+UBE. However, the present application is not limited to such manner. In an embodiment, according to actual situation, any combination of vectors selected from the local gain adjustment vector, the high saturation suppression vector, the low echo recovery vector and the brightness equalization vector may be added to obtain the manipulated variable vector U.

The manipulated variable vector determined by image content-based adaptive calculation may be described in detail in the foresaid embodiments; however, the present application is not limited to such embodiments. In an embodiment, the manipulated variable vector U may be determined by computing with user-based input and interaction and interpreting and translating the user-based input according to a predetermined rule. Taking a touch screen as a user-based input device for an example, an input may be generated by a user (e.g. a doctor) through touching on the touch screen, then computing and analyzing coordinates of touch points and tendency varied with time, starting and ending points of a finger on the screen, speed, acceleration and moving path, and accordingly, referring to the predetermined rule, each parameter, i.e. the local gain adjustment vector, high saturation suppression vector, low echo recovery vector and brightness equalization vector, may be obtained based on the result of the computation and analysis.

S105, calculating an inner product according to the space fuzzy segmentation array V and the manipulated variable vector U to obtain echo increment at the specified point, so as to obtain an output image.

After obtaining the space fuzzy segmentation array V in step S103 and the manipulated variable vector U in step S104, the echo increment of the image may be calculated in this step. Specifically, at the specified point, the echo increment may be expressed as $\Delta I = U^T \cdot V$, where "T" may denote a transpose symbol of a matrix, and "·" may denote an operation symbol for calculating the inner product. As mentioned above, the lengths of the space fuzzy segmentation array V and the manipulated variable vector U may equal to n, thus the echo increment $\Delta I$ at the specified point may be obtained by eliminating the dimension of length after the operation of inner production.

In an example, the local gain adjustment vector, high saturation suppression vector, low echo recovery vector and brightness equalization vector determined in the step S104 may be set as follows:

ULGA=[3, 3, 3, 3, 3] with function of enhancing local image intensity;

UHSS=[0, 0, 0, 0, −2] with function of suppressing high saturation of ultra-high echoes;

ULER=[2, 2, 1, 0, 0] with function of raising ultra-low and low echo signals;

UBE=[0, −1, 2, 5, 0] with function of increasing levels of medium-high echoes.

Then the final manipulated variable vector U may be acquired by summation operation shown as below:

$$U=ULGA+UHSS+ULER+UBE=[5,4,6,8,1]$$

And the echo increment ΔI may be acquired by inner product computation shown as below:

$$\Delta I=U^T \cdot V=[5,4,6,8,1]^T \cdot [V_1,V_2,V_3,V_4,V_5]=5*V_1+4*V_2+6*V_3+8*V_4+1*V_5$$

Finally, by means of adjusting the echo strength at the specified point with the acquired echo increment ΔI, and taking the adjusted echo strength as the echo strength at the specified point in an output image, the output image may be obtained.

With the formula of signal variation mentioned in the step S102, after adjusting the echo strength with the echo increment ΔI, the input image may be performed with brightness correction. Since the local gain adjustment vector, the high saturation suppression vector, the low echo recovery vector and the brightness equalization vector may have been already decided, the correcting value ΔGainComp could also be calculated.

In the embodiment, according to a requirement of making intensity of the corrected image to be basically accorded with that of the image before adjusted with the dynamic range, ΔGainComp may be determined by the obtained local gain adjustment vector, the high saturation suppression vector, the low echo recovery vector, the brightness equalization vector, the final manipulated variable vector and/or the acquired echo increment. A specified determination method may be adopted by actual situation, as long as making intensity of the corrected image to be basically accorded with that of the image before adjusted with dynamic range.

After performing brightness correction with the determined ΔGainComp, an output image with uniform brightness may further be obtained.

Figure 16:
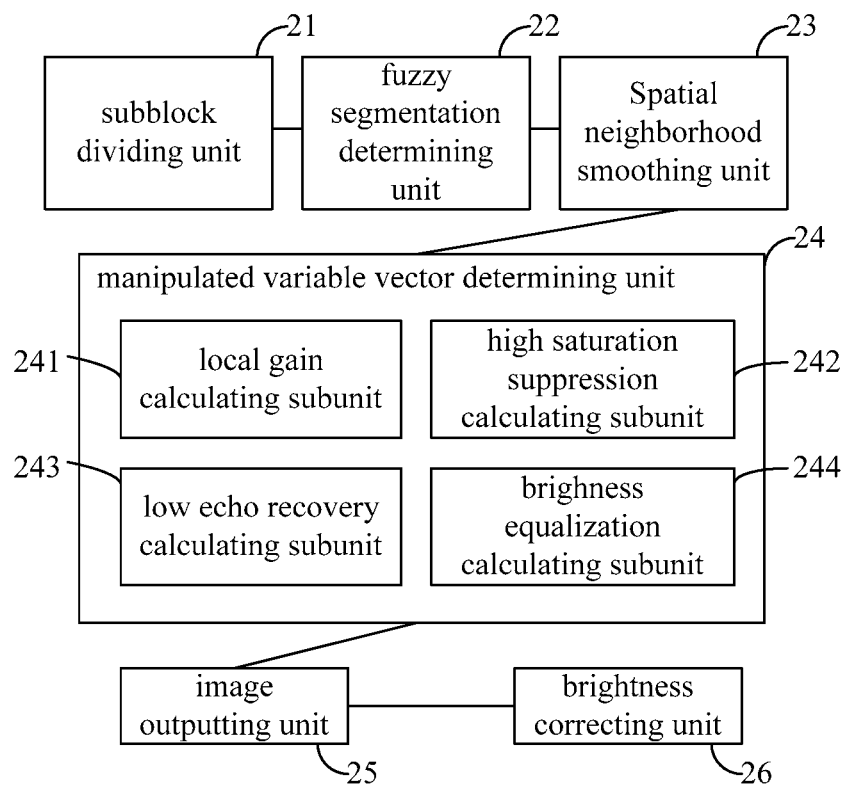
FIG. 16 is a block diagram schematically illustrating the ultrasonic imaging apparatus in accordance with an embodiment.

Corresponding to the above embodiments of the methods, an ultrasonic imaging apparatus may be provided in an embodiment of the present application. FIG. 16 is a block diagram of the ultrasonic imaging apparatus in an embodiment. As shown in the figure, the ultrasonic imaging apparatus in the embodiment may include a subblock dividing unit 21, a fuzzy segmentation determining unit 22, a spatial neighborhood smoothing unit 23, a manipulated variable vector determining unit 24, an image outputting unit 25 and a brightness correcting unit 26.

The subblock dividing unit 21 may be used for dividing an image acquired after envelope extraction into subblocks, each sub-image obtained by subblocks division may be used as the input image. In an embodiment, the subblock dividing unit 21 may be used for dividing before the envelope extraction of the image, and the divided sub-image may be used as the input image.

The fuzzy segmentation determining unit 22 may be used for inputting an echo strength at a specified point of an input image, the echo strength being used as a function input, dividing the function input with a fuzzy membership degree according to p intervals divided on a basis of the echo strength, and obtaining a space fuzzy segmentation array V at the specified point, where $V=[V_1, V_2, \ldots, V_p]$, the values of $V_1, V_2, \ldots, V_p$ may be between 0 and 1, and $V_1+V_2+ \ldots +V_p \approx 1$.

The spatial neighborhood smoothing unit 23 for performing a spatial neighborhood smooth operation after the fuzzy segmentation determining unit 22 may perform division with the fuzzy membership degree, so that points of the input image adjacent in space divided into one interval having a large fuzzy membership degree, thereby obtaining the space fuzzy segmentation array V.

The manipulated variable vector determining unit 24 may be used for determining a manipulated variable vector U for the specified point according to an input image content-based self-adaptive calculation or a user-based input, the manipulated variable vector U may be sum of any combination of vectors selected from: local gain adjustment vector ULGA, high saturation suppression vector DHSS, low echo recovery vector ULER, and brightness equalization vector UBE, wherein $ULGA=[ULGA_1, ULGA_2, \ldots, ULGA_p]$, $UHSS=[UHSS_1, UHSS_2, \ldots, UHSS_p]$, $ULER=[ULER_1, ULER_2, \ldots, ULER_p]$, $UBE=[UBE_1, UBE_2, \ldots, UBE_p]$.

The image outputting unit 25 may be used for calculating an inner product according to the space fuzzy segmentation array V acquired by the fuzzy segmentation determining unit 22 and the manipulated variable vector U acquired by the manipulated variable vector determining unit 24 to obtain echo increment ΔI at the specified point, adjusting the echo strength at the specified point with the echo increment ΔI, and taking the adjusted echo strength as an echo strength of an output image at a corresponding point, where $\Delta I=U^T \cdot V$, $U^T$ may denote a transposed matrix of U.

The brightness correcting unit 26 may be used for determining a brightness compensation ΔGainComp after the image outputting unit 25 may calculate an inner product to obtain the echo increment ΔI at the specified point, and performing brightness correction on the output image with the brightness compensation ΔGainComp.

Furthermore, in an embodiment, the manipulated variable vector determining unit 24 may include any combination of a local gain calculating subunit 241, a high saturation suppression calculating subunit 242, a low echo recovery calculating subunit 243 and a brightness equalization calculating subunit 244.

The local gain calculating subunit 241 may be used for determining local gain ΔGain at the specified point needed to be adjusted and making $ULGA_1=ULGA_2= \ldots = ULGA_p=\Delta Gain$, thereby obtaining the local gain adjustment vector ULGA.

The high saturation suppression calculating subunit 242, the low echo recovery calculating subunit 243 and the brightness equalization calculating subunit 244 may be used respectively for analyzing the input image to obtain distribution of echo signals, determining level of high saturation, and/or level of low echo loss, and/or level of brightness on a basis of the distribution, and according to each determined grade, searching for a corresponding level of high saturation suppression vector UHSS, and low echo recovery vector ULER, and brightness equalization vector UBE.

Above all, in the ultrasonic imaging method and apparatus in the embodiments, on a basis of performing fuzzy segmentation of a membership function on an echo signal, for example, dividing noises and weak echo signals into ultra-low echo signals, and dividing signals with high saturation (beyond user-based display dynamic range) into ultra-high echo signals, sequentially dividing an input image into a plurality of fuzzy segments according to a strength of an echo; dividing the image into a plurality of layers accordingly; and performing a spatial neighborhood operation on a membership degree value in the plurality of layers, so as to obtain a space fuzzy segmentation array; in another aspect, determining a manipulated variable vector of the image according to image content-based self-adaptive calculation or user-based input, flexibly weighting and stretching (calculating the inner product) space fuzzy segmentation arrays at the layers according to the manipulated variable vector finally, and adjusting and compounding the input image by using obtained echo increment and brightness compensation, so as to obtain a final output image. With the method and the apparatus of the embodiments, an image having noise background and high contrast resolution may be avoided to be processed, and side effect of direct mapping may be kept away by flexible spatial fuzzy weighting process.

From the above technical solutions, in the embodiments of the present application, by means of adjusting grayscale based on echo strength fuzzy segmentations, and using different control parameters for various segmentations to implement functions including local gain adjustment, high saturation suppression, low echo recovery and brightness equalization, thus enriching detail (resolution) of image signals.

The ultrasonic imaging method and apparatus according to an embodiment of the present application may be implemented in an ultrasonic imaging system through hardware, software, firmware or combination thereof, so that the ultrasonic imaging system may use the ultrasonic imaging method on a basis of the embodiment of the present application or may include the ultrasonic imaging apparatus based on the embodiment of the present application. In the light of the present application, such implementation could be obvious to those skilled in the art, which will not be repeated herein.

Though the above embodiments have been particularly described in details, they may only represent several modes of implementation, and cannot be construed as limiting the scope of the present application. It should be understood by those skilled in the art that a plurality of modification and improvement may be made therein without departing from the spirit of the present application. Therefore, the scope of protection of the present application shall be subject to the appended claims.

What is claimed is:

1. An ultrasonic imaging method, comprising:
   inputting an echo strength at a specified point of an input image, the echo strength being used as a function input, dividing the function input with a fuzzy membership degree according to p intervals divided on a basis of the echo strength, and obtaining a space fuzzy segmentation array V at the specified point, wherein $V=[V_1, V_2, \ldots, V_p]$, the values of $V_1, V_2, \ldots, V_p$ are between 0 and 1, and $V_1+V_2+ \ldots +V_p \approx 1$;
   determining a manipulated variable vector U for the specified point according to an input image content-based self-adaptive calculation or a user-based input, the manipulated variable vector U being sum of any combination of vectors selected from: local gain adjustment vector ULGA, high saturation suppression vector UHSS, low echo recovery vector ULER, and brightness equalization vector UBE, wherein $ULGA=[ULGA_1, ULGA_2, \ldots, ULGA_p]$, $UHSS=[UHSS_1, UHSS_2, \ldots, UHSS_p]$, $ULER=[ULER_1, ULER_2, \ldots, ULER_p]$, $UBE=[UBE_1, UBE_2, \ldots, UBE_p]$; and
   calculating an inner product according to the space fuzzy segmentation array V and the manipulated variable vector U to obtain echo increment $\Delta I$ at the specified point, adjusting the echo strength at the specified point with the echo increment $\Delta I$, and taking the adjusted echo strength as an echo strength at a corresponding point in an output image, wherein $\Delta I=U^T \cdot V$, $U^T$ denotes a transposed matrix of U.

2. The ultrasonic imaging method of claim 1, further comprising: performing a spatial neighborhood smooth operation after the step of dividing with the fuzzy membership degree, so that points of the input image adjacent in space divided into one interval having a large fuzzy membership degree, thereby obtaining the space fuzzy segmentation array V.

3. The ultrasonic imaging method of claim 1, further comprising: dividing an image acquired after envelope extraction into subblocks before the step of dividing with the fuzzy membership degree, each sub-image obtained by subblocks being used as the input image.

4. The ultrasonic imaging method of claim 1, further comprising: according to the local gain adjustment vector ULGA, the high saturation suppression vector UHSS, the low echo recovery vector ULER, the brightness equalization vector UBE and/or the echo increment $\Delta I$, determining a brightness compensation $\Delta GainComp$ after the step of calculating an inner product to obtain echo increment $\Delta I$ at the specified point, and performing brightness correction on the output image with the brightness compensation $\Delta GainComp$.

5. The ultrasonic imaging method of claim 1, wherein the step of input image content-based adaptive calculation comprises any combination of steps from:
   determining local gain $\Delta Gain$ needed to be adjusted at the specified point to allow $ULGA_1=ULGA_2= \ldots = ULGA_p=\Delta Gain$, thereby obtaining the local gain adjustment vector ULGA; and
   analyzing the input image to obtain distribution of echo signals, determining level of high saturation, and/or level of low echo loss, and/or level of brightness on a basis of the distribution, and according to each determined level, searching for a corresponding high saturation suppression vector UHSS, and/or low echo recovery vector ULER, and/or brightness equalization vector UBE.

* * * * *